United States Patent [19]

Spoeler et al.

[11] Patent Number: 4,762,069
[45] Date of Patent: Aug. 9, 1988

[54] RAIL WITH SUSPENSION AND CONDUCTOR HOLDING CLAWS

[75] Inventors: Johannes G. Spoeler, Borken; Manfred Grapentin, Herdecke, both of Fed. Rep. of Germany

[73] Assignee: Mannesmann Aktiengesellschaft, Duesseldorf, Fed. Rep. of Germany

[21] Appl. No.: 929,011

[22] Filed: Nov. 10, 1986

[30] Foreign Application Priority Data

Nov. 9, 1985 [DE] Fed. Rep. of Germany ....... 3539751

[51] Int. Cl.[4] .............................................. E01B 25/24
[52] U.S. Cl. .................................... 104/107; 104/111; 191/33 R
[58] Field of Search ................. 104/111, 109, 91, 107, 104/89, 93, 288, 110; 238/149, 122; 191/22 R, 33 R; 403/315, 316, 317

[56] References Cited

U.S. PATENT DOCUMENTS

| 1,269,714 | 6/1918 | Kimack | 238/149 |
| 4,109,768 | 8/1978 | Fromme et al. | 191/22 R |
| 4,393,785 | 7/1983 | Hörtnagel | 104/93 X |
| 4,545,303 | 10/1985 | Fujita et al. | 104/110 X |
| 4,648,777 | 3/1987 | Eichenauer | 104/89 X |

FOREIGN PATENT DOCUMENTS

| 0092608 | 11/1983 | European Pat. Off. | 104/110 |
| 3338841 | 5/1985 | Fed. Rep. of Germany | 104/110 |
| 2131371 | 6/1984 | United Kingdom | 104/111 |
| 2172562 | 9/1984 | United Kingdom | 104/109 |

*Primary Examiner*—Robert B. Reeves
*Assistant Examiner*—Scott H. Werny
*Attorney, Agent, or Firm*—Ralf H. Siegemund

[57] ABSTRACT

A rail suspension arrangement including suspending member and a rail of I beam configuration, the I beam having a web and upper and lower cross bars, one side of the web having claws for connection with conductor holders, and claws on the other side of the web that have portions facing each other to define a channel with internal overhung portions against which fastening screws are clamped. The suspending member has projecting surfaces bearing against support surfaces of the web, and has a plate from which the fastening screws extends. A supplemental rail may be interposed between the web and the suspending member.

14 Claims, 2 Drawing Sheets

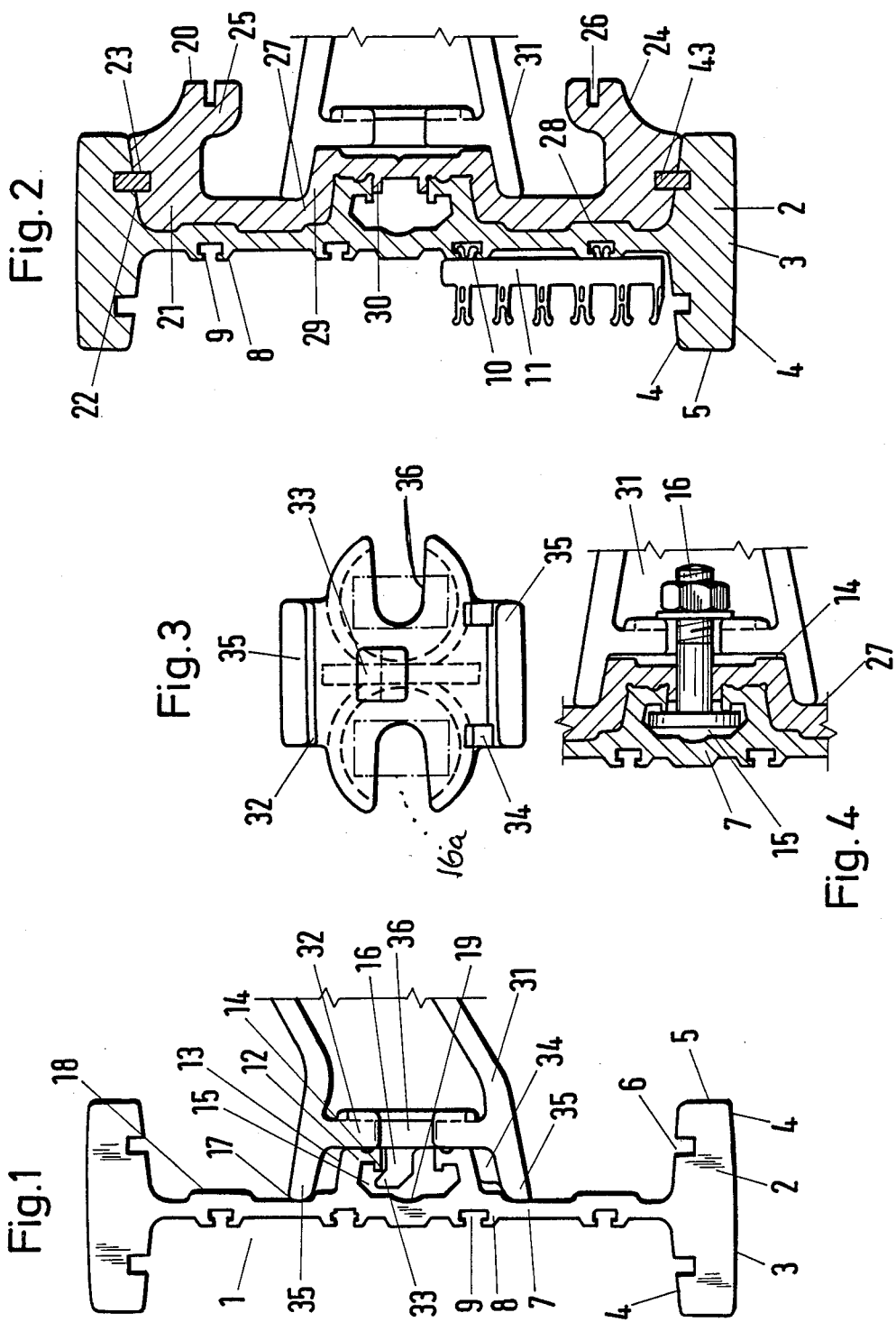

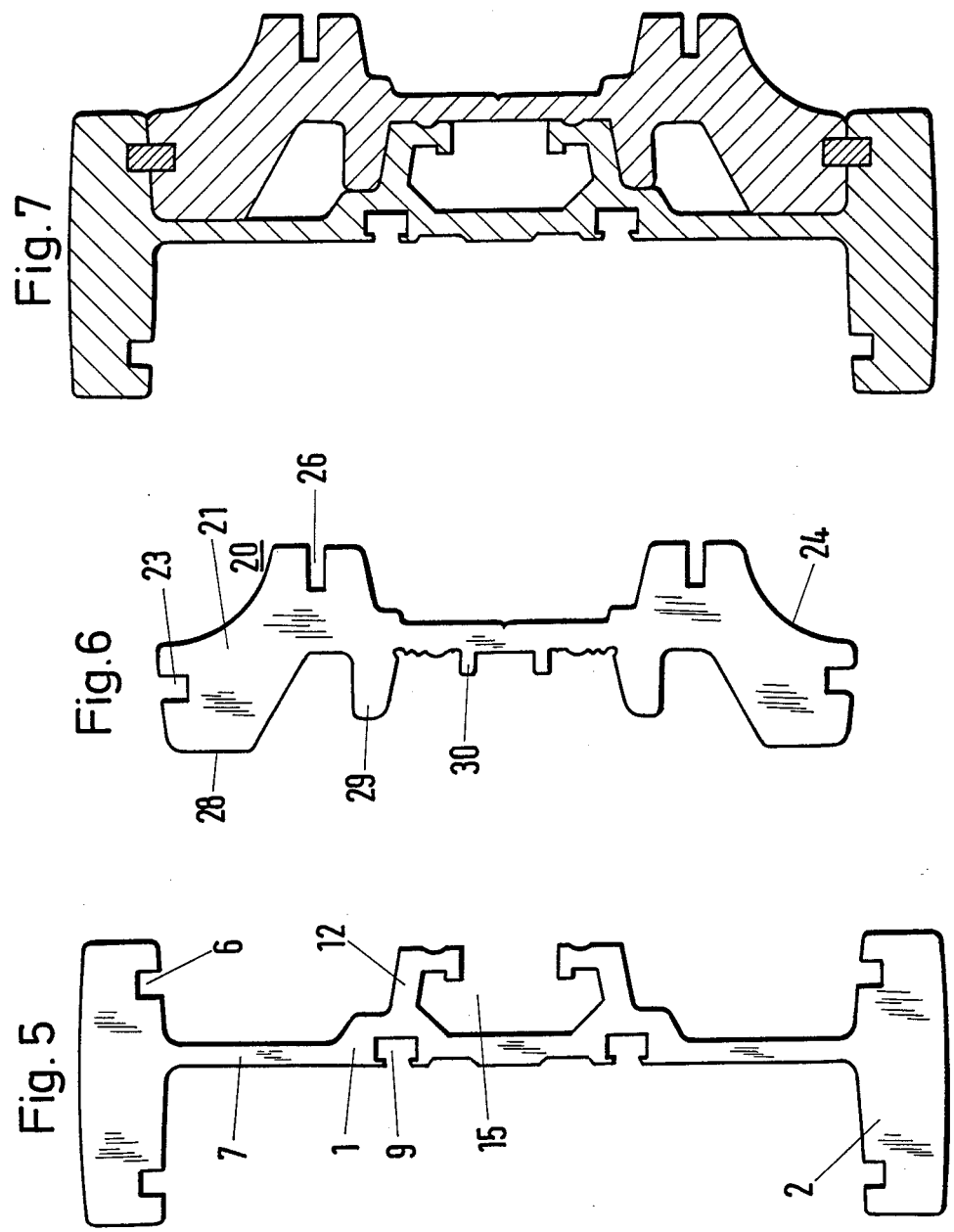

RAIL WITH SUSPENSION AND CONDUCTOR HOLDING CLAWS

BACKGROUND OF THE INVENTION

The present invention relates to an I-shaped extruded carrier rail and a rail suspension system, the rail pertaining to a rail system on which suspended trolleys, bogies, overhung trains or the like run, and wherein the center beam or web of the rail is provided with holding grooves and clamping claws for purposes of accommodating the rail suspension as well as for electrical conductors, control parts or the like.

Generally speaking a rail of the type to which the invention pertains is for example known through German petty patent No. 85 08 070. The rail as shown there is completely symmetrically constructed and on each side of the stem or web there are provided claws facing each other along the web and being provided for accommodating auxiliaries which on one side establish the connection to a carrier and rail suspension element by means of which the rail is suspended while on the other side of the web control devices and electrical conductors are provided; the conductors being bus bars for engagement with slide contacts of the passing vehicle. The holding structure for these conductors or the like are usually configured as flat section pieces and during installation they have to be pivoted in and out of an assembly position with the claws constituting obstacles. Accordingly complications are encountered during the installation which in case of an extensive rail system cumulatively expand the time needed for installation.

DESCRIPTION OF THE INVENTION

It is an object of the present invention to provide a new and improved construction for a rail of the type mentioned above such that individually and collectively the rails can be installed with considerably greater ease than was heretofore possible.

It is another object of the present invention to provide a new and improved rail construction-plus-suspension for overhung vehicles.

In accordance with the preferred embodiment of the present invention an I beam-like rail is proposed wherein on one side of the web several claws are arranged, one above each other, for insertion of holders for contact making conndductors while on the other side of the web a holding groove and channel is provided through additional claws. This channel receives matching heads of screws pertaining to a rail suspending element, and support surfaces are provided on the web above and below the channel for engaging pressure surfaces of that suspending element whereby particularly these holding elements are provided as openings for receiving the aforementioned screws.

It can thus be seen that the holding elements for electrical conductors are arranged such that they can be directly connected to the carrier rail web and with little expenditure they can be placed in the appropriate positions. The fastening of the carrier rail is facilitated through a channel which receives matching heads of screws which again greatly facilitates the installation. The load bearing surfaces of the rail suspending element bear against support surfaces of the channel of the web to prevent skewing of the rails vis-a-vis the trail suspension.

Preferably one provides rectangular heads for the screws and they can be shifted with the respective small sides between the claws into the channel. Subsequently the screws are turned by 90 degrees so that the long sides of the head reach under the claws. The screws basically can be shifted to any desired position along the carrier rail and can be clamped against the channel defining claws, particularly overhung flange portions thereof. Preferably these screws are provided wth a coarse surface where facing the overhung claw flanges with which they will engage so that upon tightening the screws these rough surfaces squeeze against the claws and will remain tight. This in turn prevents undesired and unintended shifting of the carrier rail relative to the suspending element.

For purposes of facilitating assembly, a holding nose of the suspending element, possibly next to a screw may reach behind the upper overhung flange of one of the channel defining claws and a plate of the suspending element bears against the claw itself and from the side opposite the respective overhung surface inside the channel. This holding nose permits that during assembly the carrier rail is somewhat loosely suspended on the suspending element and subsequently exact positioning, mounting and fastening is obtained. The claws (or some of the claws) on the carrier rail are provided with wedge surfaces having rising inclination towards the web and being provided for positively determining the vertical or elevational level of suspension. The lower one of these two wedge elements bears against a portion of the rail suspending element.

In order to facilitate bending of the carrier rail during installation, the web is provided with an indent being located between claws and serving for receiving a bending tool. Moreover, each of the flanges or cross bars of the I beam has a straight roller or wheel supporting and running surface; inclined surfaces are provided to both sides of each such running surface merging at new right angles with guide surfaces such that these surfaces as well as the inclinations may cooperate with appropriate stabilizing rollers of a bending structure which will engage these lateral guide surfaces and will not frictionally engage (and bear) the upper and lower surfaces of the I beam cross bars.

In furtherance of the invention the principal rail may be reinforced by a supplemental rail on that side facing the suspending element. This supplemental rail is provided with a portion matching on the inside, the outside of the channel defining claws on the principal rails, and being further matched as far as its cross bars are concerned to the inside inclination of the cross bars of the principal rail. The cross bars of the rails, where abutting, should have complementary grooves for sliding in connecting bars.

The supplemental rails may have a length that is tied to its specific purpose. It may have the usual rail length of 6 to 7 meters (i.e. about 20 feet) which is particulary suitable if there is no possibility for providing for a suspension at some location or another in the rail system. The supplemental rail can also serve as abutting, longitudinal connector between two sequential rails in the rail system, and in that case the supplemental rail may have a length of only 0.5 m. Finally a very short section of such supplemental rail may have a length of about 30 mm (or 1.2 inch), or may serve as local holder for auxiliary equipment.

The supplemental rail has extensions of the cross bar flanges which in turn have grooves for receiving screws; these grooves have teeth so that screws can be threaded in without requiring separate thread cutting in the auxiliary or supplemental rail. The extensions of the supplemental rail should project into the running path of any vehicle so that a transition area is provided to continue lateral surfaces of the cross bars of the principal rail.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cross section through a carrier in accordance with the preferred embodiment of the present invention for practicing the best mode thereof particularly in conjunction with the also illustrated rail suspending element;

FIG. 2 is a cross section through a rail of the same type but showing a supplemental or reinforcing rail;

FIG. 3 is a front view of the connecting elements shown in FIG. 1;

FIG. 4 is a section view through the screw connection of the suspending element as connected with the rail shown in FIG. 2;

FIG. 5 illustrates an end view of an asymmetric carrier rail constituting another embodiment of the present invention;

FIG. 6 illustrates an end view of a supplemental reinforcing rail; and

FIG. 7 illustrates a section view of a connection of principal and supplemental rails in accordance with FIGS. 5 and 6.

Proceeding now to the detailed description of the drawings, the carrier rails illustrated in the figures have a number of basically similar parts, including some details but differ in some minor aspects. As far as the common features are concerned the rails 1 each have a central web 7 and have upper and lower cross bars, 2a and 2b, respectively constituting flanges. The outer surfaces 3a and 3b constitute the running surfaces being provided for engagement with rollers or wheels of a vehicle. These surfaces are strictly horizontal i.e. they extend parallel to each other and at right angles to the web 7. Inclinations 4 continue laterally of these horizontally running surfaces on both sides and these inclinations in turn end in perpendicular guide surfaces 5 of the flanges or cross bars 2a and 2b. The cross bars have additional flat surfaces 4a being so to speak on the other side of the inclinations 4. Longitudinal grooves 6 are provided in these surfaces 4a; they do not serve any immediate purpose but are provided whenever supplemental rails such as 20 are used. These grooves 6 correspond (complement) in a geometric sense to grooves 23 in the supplemental rails 20 and transverse bars 43 are slid into pairs of grooves 6, 23 to interconnect rails 1 and 20.

The carrier rails 1 as shown in FIGS. 1 and 2 have an axis of symmetry and claws 8 are provided in and along the web 7. These claws come in pairs and, therefore, each pair forms a groove such as 9. Reference numeral 11 generally refers to a holder or mounting elements for electrical conductors, and this holder is provided with clamps 10 which are inserted in some of the grooves 9 as shown specifically in FIG. 2. An analogous arrangement is shown in FIG. 1 or FIGS. 5 and 7. The carrier rail in each instance and on the other side of the web 7 is provided with two additional claws 12 which in fact face each other through flanges 14. They thus establish a channel 15 for the heads 16a of screws 16, and the flanges 14 are at overhung portions of the claws. The screws 16 pertain to and extend from a support and suspending element 31 of the rail system and will be described more fully below.

The outside of these claws 12 are configured to establish inclined, wedge forming surfaces 13 and 13a. These surfaces cooperate with the supplemental rail 20 shown only in FIG. 2 and here with correspondingly i.e. geometrically-mechanically contoured and configured surfaces of a portion 29 of rail 20. The lower one of the wedging surfaces, denoted by 13a, and when not used in conjunction with a supplemental rail, bears against a support member 34 of the suspending element 31. This member or element 31 has a plate 32 which abuts the overhung portions of the claws 12 from the outside. Pressure feet 35 of plate 32 bear against support surfaces 17 of the web 7 of rail 1.

The rail suspending member 31 is provided with a holding nose 33 which projects into the channel 15. FIG. 4 is applicable to FIG. 2 and illustrates specifically the arrangement of the head 16a of a screw 16 that projects into the channel 15. The corresponding nut 15a, by means of which the screw 16 is fastened, abuts against the plate 32 on the side facing away from the claws 12. FIG. 1 illustrates the possibility of having, in that fashion, the member 31 connected directly to the claw structure 12, while FIGS. 3 and 4 show that the connection can be made to the matching portion of the supplemental rail 20, whereby the part 29 of that supplemental rail 20 embraces the claw structure 12 but this embracing portion is provided with an aperture to accommodate the screw 16. The plate 32 in this case abuts part 29 of supplemental rail 20 and the inside of that contoured part 29 abuts the outside portions of the claws 12.

As shown in FIGS. 2, 3 and 4 the rail suspending structure 31 also has a (distorted) I-beam profile with the plate 32 constituting the web of that I shaped profile. In FIG. 3, slots 36 are provided on both sides of plate 32 in order to receive the screws 16. The screws 16 are shown specifically in FIG. 3 to have rectangular heads 16a. As shown in FIG. 2 the auxiliary rail 20 has flanges or cross bars 21. These cross bars 21 are provided with clamping surfaces 22 which match the oblique inside surface portions 4a of the cross bars of the principal rail 1. These clamping surfaces 22 in turn have grooves 23. As mentioned already, these grooves 23 receive connecting bars 43. Since the grooves 23 are aligned and match the sliding grooves 6 of the cross bars 2a and 2b of the principal rail these connecting bars 43 can in fact be inserted into the respective complementary grooves so as to connect the two rails i.e. the principal rails and auxiliary rail 20 together.

Curved portions 24 extend from the flanges 21 and constitute surface portions of flange extensions 25. The extensions are provided with grooves 26. These grooves 26 are provided with teeth and permit the threading in of screw threads without having to cut any specific threads.

The web 27 of the auxiliary rail 20 has the portion 29 which can also be termed a clamping section and it matches the wedging surfaces 13, 13a of the claws 12 of the principal rail 1. The section 29 of rail 20 includes centering bars 30 which project into the channel 15 and about flanges 14 of rail 1. The principal carrier rail has to be supported in some cases in the area or zone of the auxiliary rail 20. In this case then, auxiliary rail 20 will receive and will be provided with a longitudinal slot being disposed in between the centering bars 30. This longitudinal slot then permits insertion of one of the screws 16 (depending upon the length extensions of the auxiliary rail 20) into the channel 15. Thereafter the screw can be turned in the appropriate fashion.

In the example shown in FIGS. 5,6 and 7 the web 7 of the principal carrier bar 1' supports cross bars 2'a and 2'b which are asymmetrical to the center plane of the web 7. The grooves 9 in this case for the conductors are completely recessed in the web 7 and face the claws 12 from the inside. Otherwise the claws 12 in this embodiment form the channel 15 just as in the example shown in FIGS. 1 and 2. The auxiliary rail 20' shown in FIG. 6 also has a clamping section 29' as afore-described and there are also centering bars 30 as were shown in FIG. 2. However in this case the clamping portions 29" of section 29' project in a ridge-like fashion towards the support surfaces on rail 1'.

The auxiliary rail 20' is specifically matched to the principal rail as shown specifically in FIGS. 5 and 7. The rail 20' has longitudinal ribs 28 abutting the web 7 of the principal rail 1' shown in FIG. 5, and there are also slide-in grooves 23, being flush with and corresponding to the grooves 6 in the cross bars such as 2a' etc. to receive connecting bars 43. The suspending element 31 is connected to the rail in the example shown in FIGS. 5, 6, and 7 in the same fashion that the element is connected to the rail in FIGS. 1,2,3 and 4.

The invention is not limited to the embodiments described above but all changes and modifications thereof not constituting departures from the spirit and scope of the invention are intended to be included.

What is claimed is:

1. A carrier rail of I-beam configuration having a web and two cross bars wherein the web has claws for connection to rail suspending structure and conductor holders, comprising:
   first claws for conductive holders on one side of the web;
   second claws with overhung flange portions on an opposite side of the web and forming a channel, for receiving heads of connecting screws of the rail suspending structure;
   said second claws further having surface portions facing each of said cross bars and being configured as inclined wedging surfaces;
   and an auxiliary carrier being provided with a contour matching portion gripping around and covering said second claws and said wedging surfaces and engaging said crossbars.

2. A carrier rail as in claim 1 wherein said second claws are provided with squeezing flanges facing said screw head.

3. A carrier rail as in claim 1 said cross bars each having an outwardly directed central running surface being perpendicular to the web, there being additionally obliquely oriented surfaces on the inside of said cross bars, which engage said auxiliary carrier.

4. A carrier rail as in claim 1 said web being provided with longitudinal ribs above and below said support surfaces.

5. A rail suspension structure, there being a suspending member and a rail of I beam configuration, the I beam having a web and upper and lower cross bars, the suspension structure comprising:
   a pair of claws on the web having portions facing each other and defining a channel with internal overhung portions;
   support surfaces on the web above and below the claws; and
   said suspending member having projecting surfaces bearing against said support surfaces, further having a plate from which extends a fastening screw having a head, the head being inserted in said channel and bearing against said overhung portions.

6. The suspension structure as in claim 5, there being a nose extending from the plate laterally offset from the screw and being behind the overhung portions of one of the claws.

7. The suspension structure as in claim 5, a support element extending from the suspension member and bearing against a lower one of the claws, from below.

8. A carrier rail of I-beam configuration having a web and two cross bars wherein the web has claws for connection to rail suspending structure and conductor holders, comprising:
   first claws for conductive holders on one side of the web;
   second claws with overhung flange portions on an opposite side of the web and forming a channel, for receiving heads of connecting screws of the rail suspending structure;
   support surfaces on the web along the second claws, reinforcing auxiliary rail connected to the web of the carrier rail and on the same side as said second claws are provided; and
   complementary grooves respectively in said carrier rail and said auxiliary rail, there being connecting bars inserted in the complementary grooves so as to interconnect the carrier rail and the auxiliary rail.

9. A carrier rail of I-beam configuration having a web and two cross bars wherein the web has claws for connection to rail suspending structure and conductor holders, comprising:
   first claws for conductive holders on one side of the web;
   second claws with overhung flange portions on an opposite side of the web and forming a channel, for receiving heads of connecting screws of the rail suspending structure; reinforcing auxiliary rail connected to the web of the principal rail and on the same side as said second claws are provided; there being support surfaces along the second claws against which the auxiliary rail abuts; and
   the auxiliary rail having a web means and cross bars with extensions, the extensions having grooves being provided with threading facing away from the web means of the auxiliary carrier.

10. Carrier bar as in claim 9 wherein the grooves provided with threading have teeth for engagement with the counterthread.

11. A carrier rail of I-beam configuration having a web and two cross bars wherein the web has claws for connection to rail suspending structure and conductor holders, comprising:
   a plurality of first claws on one side of the web; conductive holders inserted in said first claws;
   second claws larger than the first claws, and having overhung flange portions, and being disposed on an opposite side of the web, for forming a channel;

support surfaces on the web, alongside the second claws, outside of said channel; and suspension means, including means inserted in said channel as well as means bearing against said support surfaces.

12. A carrier rail as in claim 11, wherein said second claws have surface portions facing away from each other and being configured as inclined wedging surfaces, said suspension means bearing also against these wedging surfaces.

13. A carrier rail as in claim 11, said web being provided with longitudinal ribs above and below said support surfaces.

14. A carrier rail as in claim 11, said suspension means including a reinforcing auxiliary rail connected to the web of the carrier rail and on the same side as said second claws are provided.

* * * * *